US012277417B2

United States Patent
Mishra et al.

(10) Patent No.: US 12,277,417 B2
(45) Date of Patent: *Apr. 15, 2025

(54) SOURCE CODE-BASED DETERMINATION OF DIFFERENCES BETWEEN WEB ELEMENTS OF DIFFERENT VERSIONS OF A WEB APPLICATION

(71) Applicant: Dell Products L.P., Round Rock, TX (US)

(72) Inventors: Abhishek Mishra, Bangalore (IN); Anusha N, Bangalore (IN); Shalini Tiwari, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 18/118,807

(22) Filed: Mar. 8, 2023

(65) Prior Publication Data
US 2024/0303074 A1    Sep. 12, 2024

(51) Int. Cl.
*G06F 8/71* (2018.01)
*G06F 8/30* (2018.01)
*G06F 40/14* (2020.01)

(52) U.S. Cl.
CPC .............. *G06F 8/71* (2013.01); *G06F 8/31* (2013.01); *G06F 40/14* (2020.01)

(58) Field of Classification Search
CPC .......... G06F 8/31; G06F 8/71; G06F 11/3668; G06F 11/3672; G06F 11/368;

(Continued)

(56) References Cited

U.S. PATENT DOCUMENTS

| 2012/0110093 A1* | 5/2012 | Tingstrom | G06F 16/957 709/206 |
| 2015/0134629 A1* | 5/2015 | Knobloch | G06F 16/958 707/695 |

(Continued)

OTHER PUBLICATIONS

Song, Suhwan, et al., R2Z2: detecting rendering regressions in web browsers through differential fuzz testing, ICSE '22: Proceedings of the 44th International Conference on Software Engineering, Jul. 2022, 12 pages, [retrieved on Feb. 21, 2025], Retrieved from the Internet: <URL:http://dl.acm.org/>.*

(Continued)

Primary Examiner — Geoffrey R St Leger
(74) Attorney, Agent, or Firm — Ryan, Mason & Lewis, LLP

(57) ABSTRACT

An apparatus comprises a processing device configured to select first and second versions of a web application, to obtain first and second sets of source code files used for generating front ends of the first and second versions of the web application, and to generate first and second sets of tree structures based at least in part on the first and second sets of source code files, respectively. The processing device is also configured to identify node differences between the first and second sets of tree structures and to generate, based at least in part on the identified node differences, information characterizing differences between web elements of the first and second versions of the web application. The processing device is further configured to initiate automated action based at least in part on the generated information characterizing differences between web elements of the first and second versions of the web application.

20 Claims, 18 Drawing Sheets

(58) Field of Classification Search
CPC ............. G06F 11/3684; G06F 11/3688; G06F 11/3692; G06F 11/3696
See application file for complete search history.

(56) References Cited

U.S. PATENT DOCUMENTS

| | | | | |
|---|---|---|---|---|
| 2015/0161088 A1* | 6/2015 | Kamada | ................ | G06F 40/143 715/235 |
| 2018/0191764 A1* | 7/2018 | Chawla | ................ | G06F 16/951 |
| 2023/0109433 A1* | 4/2023 | Tanaka | ................ | G06F 11/3664 717/124 |

OTHER PUBLICATIONS

Choudhary, Shauvik Roy, et al., WEBDIFF: Automated Identification of Cross-browser Issues in Web Applications, IEEE International Conference on Software Maintenance, Sep. 2010, 10 pages, [retrieved on Feb. 21, 2025], Retrieved from the Internet: <URL:http://ieeexplore.ieee.org/>.*
A. Alshamrani et al., "A Comparison Between Three SDLC Models Waterfall Model, Spiral Model, and Incremental/Iterative Model," IJCSI International Journal of Computer Science Issues, vol. 12, No. 1, Jan. 2015, pp. 106-111.
Selenium, "Selenium WebDriver," https://www.selenium.dev/other/, Accessed Sep. 28, 2022, 3 pages.
E. Hernandez, "What Are The Best UI Test Automation Tools?" https://techcommunity.microsoft.com/t5/testingspot-blog/what-are-the-best-ui-test-automation-tools/ba-p/367781, Mar. 13, 2019, 10 pages.
Cypress.Io, "Why Cypress?" https://docs.cypress.io/guides/overview/why-cypress#What-you-ll-learn, Accessed Sep. 28, 2022, 8 pages.
U.S. Appl. No. 17/956,967 filed in the name of Abhishek Mishra et al. on Sep. 30, 2022, and entitled "Determining Differences Between Web Elements of Different Versions of a Web Application."

* cited by examiner

```
<div class="dds_col-3 dds_col—sm-3 ">
    <div class-"dds_card" style="background-color: #A8396F; color: white">
        <div class="dds_card_content">
            <div class="dds_card_header" style="margin-left : 5px">

<span class="dds_card_header_text">
                    <h5>Total RPA Volume</h5>
                </span>
            </div>
            <div class="dds_card_body" style="margin-left : 100px">
                <p>{{rpa_vol}}</p>
            </div>
        </div>
    </div>
</div>
```

SOURCE CODE-BASED DETERMINATION OF DIFFERENCES BETWEEN WEB ELEMENTS OF DIFFERENT VERSIONS OF A WEB APPLICATION

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client-server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for source code-based determination of differences between web elements of different versions of a web application.

In one embodiment, an apparatus comprises at least one processing device comprising a processor coupled to a memory. The at least one processing device is configured to select first and second versions of at least a given portion of a web application, to obtain a first set of source code files used for generating a front end of the first version of the given portion of the web application and a second set of source code files used for generating a front end of the second version of the given portion of the web application, and to generate a first set of one or more tree structures based at least in part on the first set of source code files and a second set of one or more tree structures based at least in part on the second set of source code files, the first and second sets of one or more tree structures comprising nodes representing web elements of the given portion of the web application. The at least one processing device is also configured to identify node differences between the first and second sets of one or more tree structures and to generate, based at least in part on the identified node differences, information characterizing differences between web elements in the given portion of the first and second versions of the web application. The at least one processing device is further configured to initiate execution of at least one automated action based at least in part on the generated information characterizing differences between web elements in the given portion of the first and second versions of the web application.

These and other illustrative embodiments include, without limitation, methods, apparatus, networks, systems and processor-readable storage media.

BRIEF DESCRIPTION OF THE DRAWINGS

FIG. 6 shows a Hypertext Markup Language (HTML) source code file for a web application in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
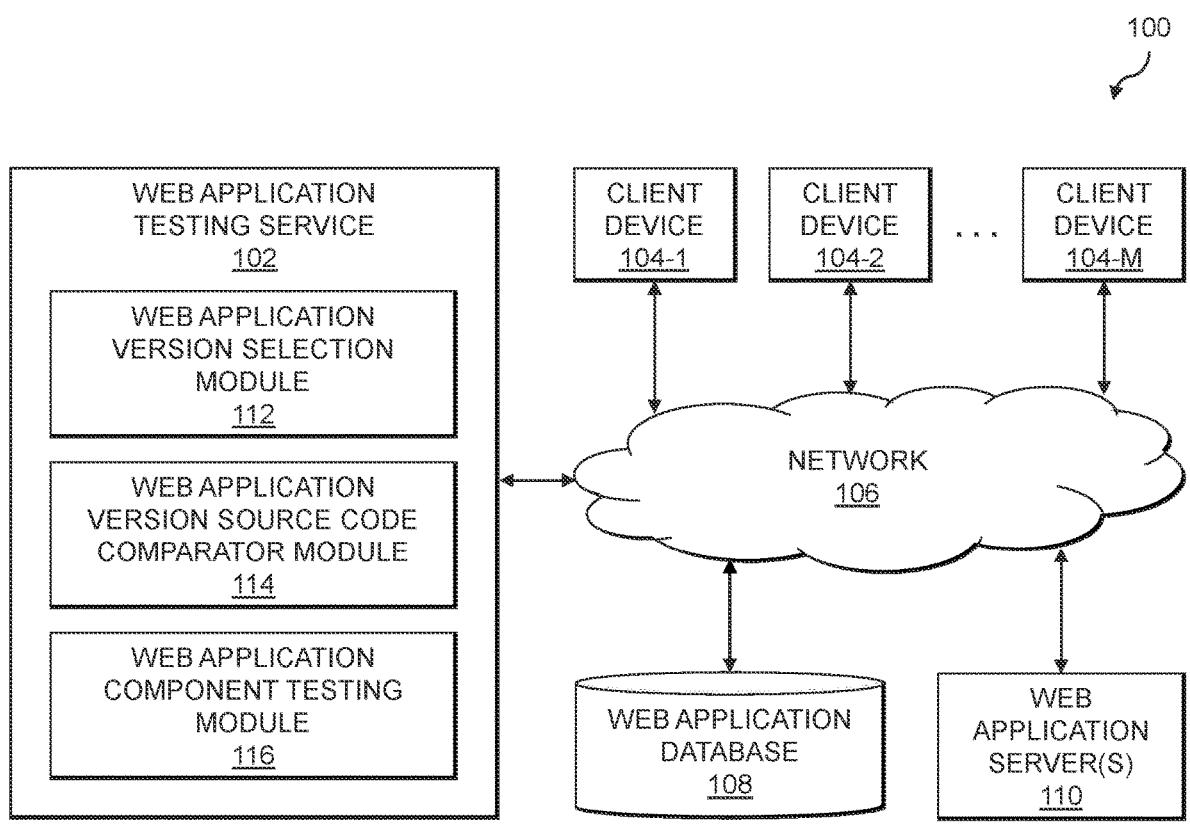
FIG. 1 is a block diagram of an information processing system configured for source code-based determination of differences between web elements of different versions of a web application in an illustrative embodiment.

FIG. 1 shows an information processing system 100 configured in accordance with an illustrative embodiment. The information processing system 100 is assumed to be built on at least one processing platform and provides functionality for source code-based determination of differences between web elements of different versions of a web application. The information processing system 100 includes a web application testing service 102, which is coupled via a network 106 to a set of web application servers 110. The web application servers 110 are assumed to be accessed, over network 106, by client devices 104-1, 104-2, . . . 104-M (collectively, client devices 104), such as via web browsers running on the client devices. Also coupled to the network 106 is a web application database 108, which may store various information relating to the web applications hosted by the web application servers 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The web application database 108, as discussed above, is configured to store and record information relating to web applications hosted by the web application servers 110. Such information may include, but is not limited to, component hierarchies for the web applications, string identifiers for components of the web applications, source code files (e.g., Hypertext Markup Language (HTML) files, Cascading Style Sheets (CSS) files, JavaScript (JS) files, etc.) for different versions of portions of web applications, etc.

The web application database 108 in some embodiments is implemented using one or more storage systems or devices associated with the web application testing service 102 or web application servers 110. In some embodiments, one or more of the storage systems utilized to implement the web application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the web application testing service 102, the client devices 104, the web application database 108, and the web application servers 110, as well as to support communication between the web application testing service 102, client devices 104, web application database 108, web application servers 110 and other related systems and devices not explicitly shown.

In some embodiments, the client devices 104 and/or web application servers 110 may implement host agents that are configured for communication with the web application testing service 102. The host agents may be configured to invoke the web application testing service 102 when a particular web application (e.g., that is hosted by one of the web application servers 110 and which is run partially in a web browser on one of the client devices 104) is updated so as to determine which elements of the web application have been added, removed or altered, for generating test cases for testing such added, removed or altered elements, for generating reports characterizing the element differences between the different versions of the web application, for generating locators to the added, removed or altered elements, etc.

It should be noted that a "host agent" as this term is generally used herein may comprise an automated entity, such as a software entity running on a processing device. Accordingly, a host agent need not be a human entity.

Although shown as separate from the client devices 104 and web application servers 110 in the FIG. 1 embodiment, it should be appreciated that the web application testing service 102 may be implemented at least in part within one or more of the client devices 104 or web application servers 110 in some embodiments.

The web application testing service 102 in the FIG. 1 embodiment is assumed to be implemented using at least one processing device. Each such processing device generally comprises at least one processor and an associated memory, and implements one or more functional modules for controlling certain features of the web application testing service 102. In the FIG. 1 embodiment, the web application testing service 102 implements a web application version selection module 112, a web application version source code comparator module 114, and a web application component testing module 116.

The web application version selection module 112 is configured to select first and second versions of at least a given portion of a web application, and to obtain first and second sets of source code files used for generating a front end of the first and second versions of the given portion of the web application. The web application version source code comparator module 114 is configured to generate a first set of one or more tree structures based at least in part on the first set of source code files and a second set of one or more tree structures based at least in part on the second set of source code files, the first and second sets of one or more tree structures comprising nodes representing web elements of the given portion of the web application. The web application version source code comparator module 114 is also configured to identify node differences between the first and second sets of one or more tree structures, and to generate, based at least in part on the identified node differences, information characterizing differences between web elements in the given portion of the first and second versions of the web application. The web application component testing module 116 is configured to initiate at least one automated action based at least in part on the generated information characterizing differences between web elements in the given portion of the first and second versions of the web application. Such an automated action may include, but is not limited to, selecting and running automation test cases for testing web elements of the first version of the web application which are changed from the second version of the web application.

It is to be appreciated that the particular arrangement of the web application version selection module 112, the web application version source code comparator module 114, and the web application component testing module 116 illustrated in the FIG. 1 embodiment is presented by way of example only, and alternative arrangements can be used in other embodiments. As discussed above, for example, the web application testing service 102, or portions thereof such as one or more of the web application version selection module 112, the web application version source code comparator module 114, and the web application component testing module 116, may in some embodiments be implemented internal to one or more of the client devices 104 or web application servers 110. As another example, the functionality associated with the web application version selection module 112, the web application version source code comparator module 114, and the web application component testing module 116 may be combined into one module, or separated across more than three modules with the multiple modules possibly being implemented with multiple distinct processors or processing devices.

At least portions of the web application version selection module 112, the web application version source code comparator module 114, and the web application component testing module 116 may be implemented at least in part in the form of software that is stored in memory and executed by a processor.

It is to be understood that the particular set of elements shown in FIG. 1 for source code-based determination of differences between web elements of different versions of a web application is presented by way of illustrative example only, and in other embodiments additional or alternative elements may be used. Thus, another embodiment may include additional or alternative systems, devices and other network entities, as well as different arrangements of modules and other components.

The web application testing service 102 and other portions of the system 100 may be part of cloud infrastructure as will be described in further detail below. The cloud infrastructure hosting the web application testing service 102 may also host one or more of the web application servers 110 and/or client devices 104.

The web application testing service 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The web application testing service 102, client devices 104, web application database 108 and web application servers 110 or components thereof may be implemented on respective distinct processing platforms, although numerous other arrangements are possible. For example, in some embodiments at least portions of the web application testing service 102 and one or more of the client devices 104 or web application servers 110 are implemented on the same processing platform. A given one of the web application servers 110 or client devices 104 can therefore be implemented at least in part within at least one processing platform that implements at least a portion of the web application testing service 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the web application testing service 102, client devices 104, web application database 108 and web application servers 110, or portions or components thereof, to reside in different data centers. Numerous other distributed implementations are possible. The web application testing service 102 or portions thereof can also be implemented in a distributed manner across multiple data centers.

Additional examples of processing platforms utilized to implement the web application testing service 102 and other portions of the system 100 in illustrative embodiments will be described in more detail below in conjunction with FIGS. 14 and 15.

It is to be appreciated that these and other features of illustrative embodiments are presented by way of example only, and should not be construed as limiting in any way.

An exemplary process for source code-based determination of differences between web elements of different versions of a web application will now be described in more detail with reference to the flow diagram of FIG. 2. It is to be understood that this particular process is only an example, and that additional or alternative processes for source code-based determination of differences between web elements of different versions of a web application may be used in other embodiments.

In this embodiment, the process includes steps 200 through 210. These steps are assumed to be performed by the web application testing service 102 utilizing the web application version selection module 112, the web application version source code comparator module 114, and the web application component testing module 116. The process begins with step 200, select first and second versions of at least a given portion of a web application. The first version of the given portion of the web application may be associated with a current release of the web application and the second version of the given portion of the web application may be associated with a previous release of the web application. At least one of the first version of the given portion of the web application and the second version of the given portion of the web application may comprise a non-production version of the given portion of the web application. The given portion of the web application may comprise a web page of the web application. Step 200 may include selecting a first location where the first set of source code files used for generating the front end of the first version of the given portion of the web application are stored, and selecting a second location where the second set of source code files used for generating the front end of the second version of the given portion of the web application are stored.

In step 202, a first set of source code files used for generating a front end of the first version of the given portion of the web application and a second set of source code files used for generating a front end of the second version of the given portion of the web application are obtained. Each of the first and second sets of source code files may comprise one or more HTML files and one or more CSS files. In step 204, a first set one or more tree structures is generated based at least in part on the first set of source code files and a second set of one or more tree structures is generated based at least in part on the second set of source code files. The first and second sets of one or more tree structures comprising nodes representing web elements of the given portion of the web application. Node differences between the first and second sets of one or more tree structures are identified in step 206.

The first set of one or more tree structures may comprise a first tree structure generated based at least in part on one or more HTML files in the first set of source code files and a second tree structures generated based at least in part on one or more CSS files in the first set of source code files, and the second set of one or more tree structures may comprise a third tree structure generated based at least in part on one or more HTML files in the second set of source code files and a fourth tree structure generated based at least in part on one or more CSS files in the second set of source code files. Step 206 may comprise: identifying one or more nodes present in the first tree structure which are not present in the third tree structure as added web elements in the first version of the given portion of the web application; identifying one or more nodes present in the third tree structure which are not present in the first tree structure as deleted web elements in the first version of the given portion of the web application; identifying one or more nodes having element properties in the first tree structure that are different than element properties in corresponding nodes in the third tree structure as modified web elements in the first version of the given portion of the web application; and identifying one or more nodes in the first tree structure which reference styling properties in the second tree structure which are different than styling properties in the fourth tree structure as modified web elements in the first version of the given portion of the web application.

Figure 2:
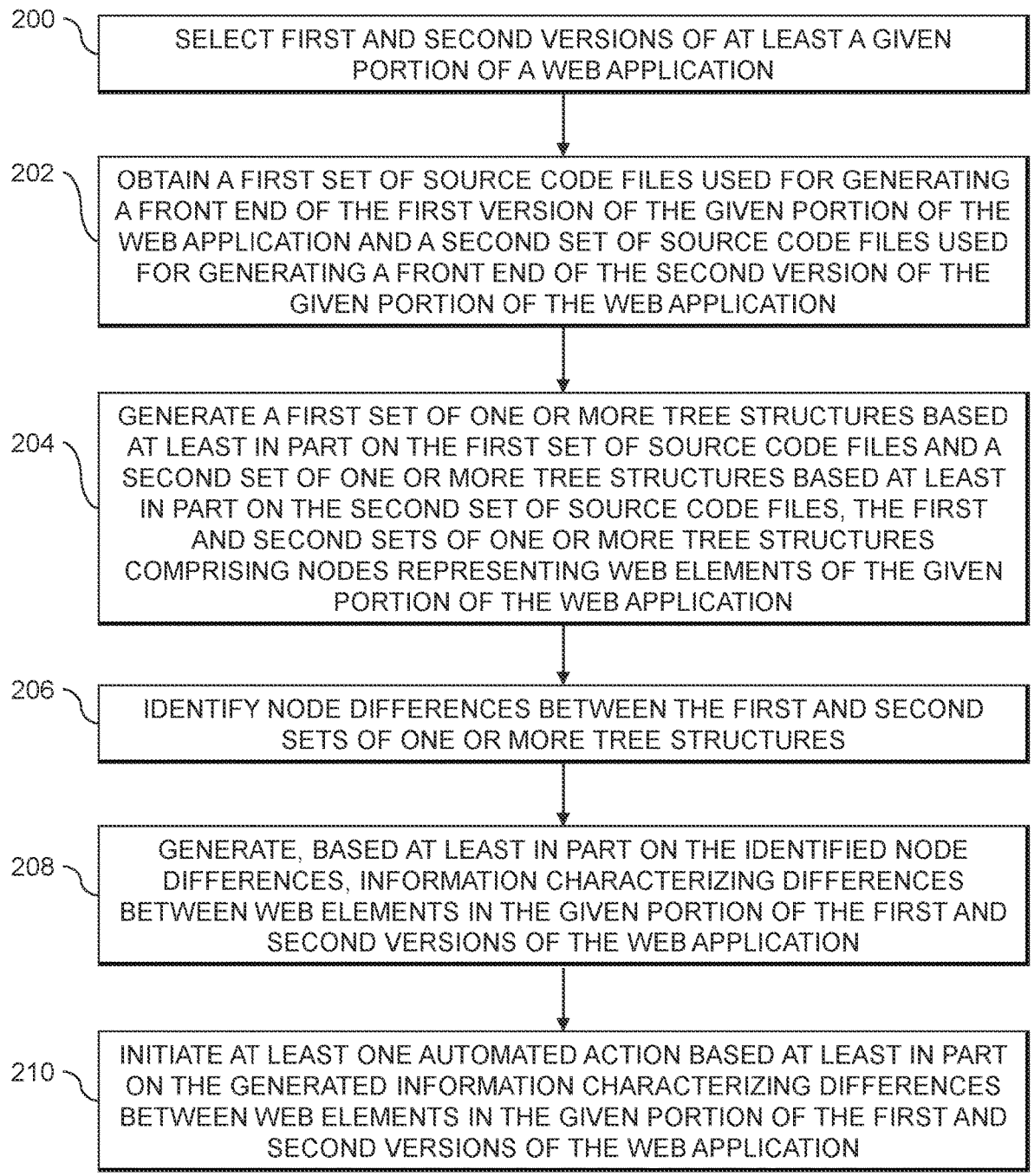
FIG. 2 is a flow diagram of an exemplary process for source code-based determination of differences between web elements of different versions of a web application in an illustrative embodiment.

The FIG. 2 process continues with step 208, where information characterizing differences between web elements in the given portion of the first and second versions of the web application is generated based at least in part on the identified node differences. At least one automated action is initiated in step 210 based at least in part on the generated information characterizing differences between web elements in the given portion of the first and second versions of the web application.

The automated action may include generating locators for the web elements which are added, deleted and modified in the given portion of the first version of the web application relative to the given portion of the second version of the web application. The generated locators may comprise Extensible Markup Language (XML) Path Language (XPath) locators. The generated locators may be utilized for updating one or more automation test cases for testing of the first version of the web application.

The automated action may also or alternatively include generating visualizations of the web elements which are added, deleted and modified in the given portion of the first version of the web application relative to the given portion of the second version of the web application. The automated action may further or alternatively include generating links to code files of the web elements which are added, deleted and modified in the given portion of the first version of the web application relative to the given portion of the second version of the web application. The automated action may also or alternatively include generating a tabular view categorizing which of the web elements are added, deleted and modified in the given portion of the first version of the web application relative to the given portion of the second version of the web application.

In some embodiments, the automated action includes running one or more automation test cases for testing web elements in the given portion of the first version of the web application which are changed relative to the second version of the web application. The one or more automation test cases may be selected from an automation testing suite, the one or more automation test cases being customized for testing of the web elements in the given portion of the first version of the web application which are changed relative to the second version of the web application.

Figure 3:
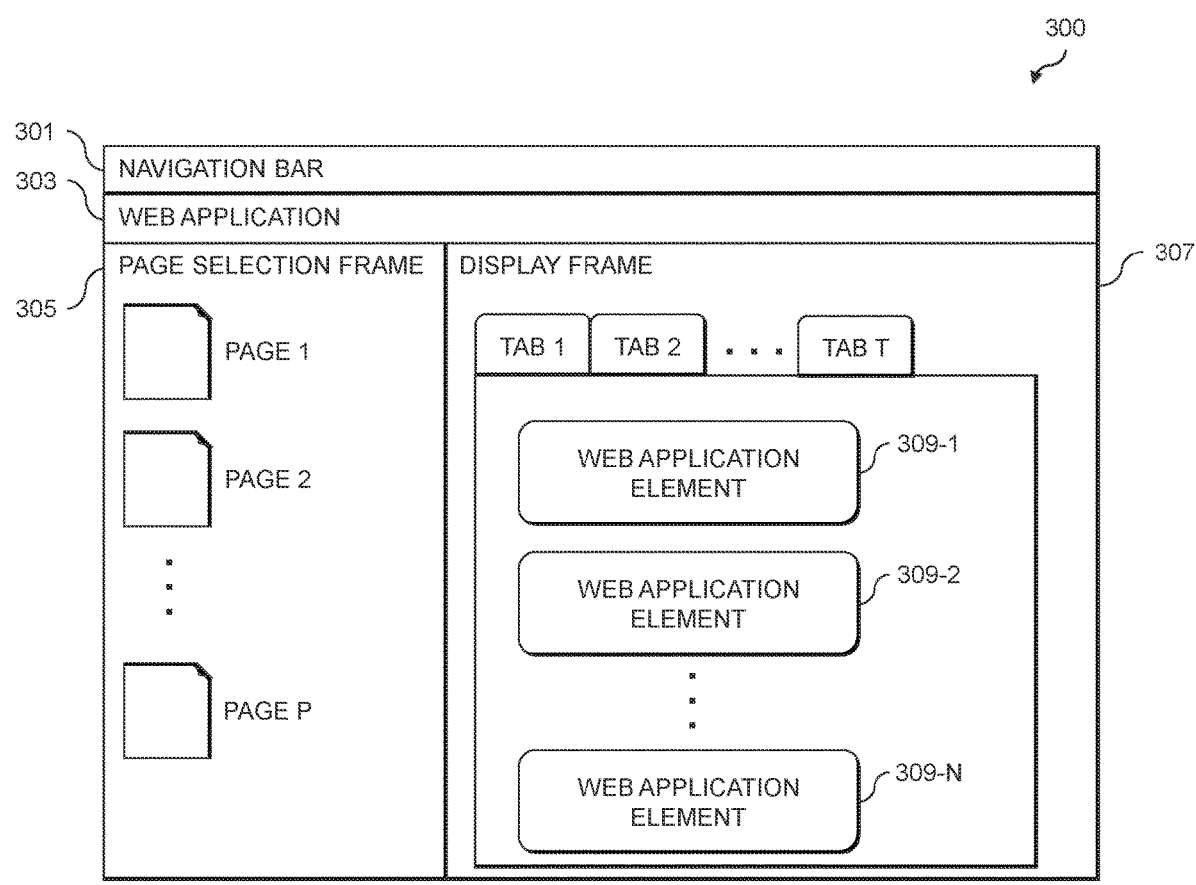
FIG. 3 illustrates a view of different portions of a web application in an illustrative embodiment.

FIG. 3 shows an example layout 300 of a web application 303. The layout 300 includes a navigation bar 301, which may be a portion of a web browser that is utilized to type in or otherwise input uniform resource locators (URLs) to load the web application 303. The web application 303 also includes a page selection frame 305, allowing a user to select from pages 1, 2, . . . . P to present in the display frame 307. The display frame 307 as shown includes a set of tabs 1, 2, . . . . T. When a particular page and tab are selected (e.g., page 1, tab 1) that page or tab gets loaded into the display frame 307, along with a set of web application elements 309-1, 309-2, . . . 309-N (collectively, web application elements 309). The web application elements 309 may comprise charts, plots, tables, visualizations, widgets, or other elements of the web application 303.

Various web application frameworks may utilize a component-based architecture. Some web application frameworks further have a modular architecture, where modules are utilized to organize the web application into functional blocks wrapping components thereof (as well as other parts or portions of the web application, such as directives and services). In the modular architecture, the web application includes a root module and possibly one or more additional modules. Each of the additional modules may be utilized for a particular type of functionality or feature of the web application.

The components of a web application may be viewed as basic building blocks for a user interface (UI) of the web application. Each component may control one or more portions of the display, also referred to as views, provided by the web application. Components are self-contained, and provide reusable pieces of the UI of the web application. More generally, each component encapsulates some functionality of the web application. A given component may include a template defining a visual structure (e.g., using one or more HTML files), logic defining its behavior (e.g., using JavaScript code, TypeScript code, etc.), and a style that defines the style of the component (e.g., using one or more CSS files). Components pass data to associated views using data binding processes (e.g., by binding Document Object Model (DOM) elements to component properties). Components of the web application may utilize services (e.g., values, functions, features), where the services provide classes with a specific purpose (e.g., fetching data, logging, etc.). Services may be used to share resources across components of the web application.

Figure 4:
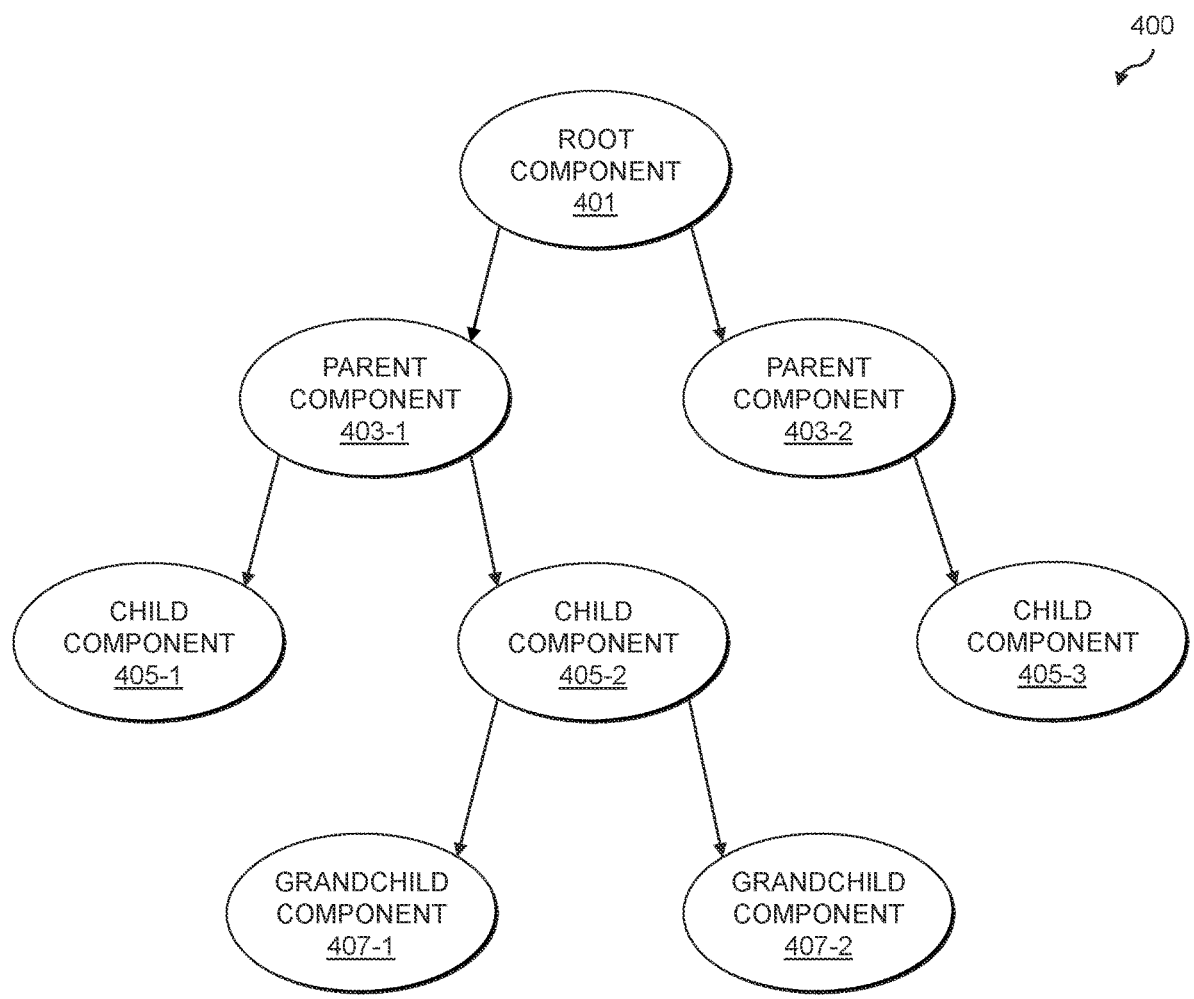
FIG. 4 shows a component hierarchy for a web application in an illustrative embodiment.

A web application may be viewed as a tree-like hierarchy of its components. FIG. 4 shows an example of a tree-like hierarchy 400 of components of a web application. In the tree-like hierarchy 400, there is a root component 401, and two parent components 403-1 and 403-2. The parent component 403-1 has two child components 405-1 and 405-2, and the parent component 403-2 has a child component 405-3. The child component 405-2 has two grandchild components 407-1 and 407-2. The root component 401 may also be referred to as an application component. To consider a specific example, the parent component 403-1 may provide a menu UI element, while the parent component 403-2 provides a shopping cart UI element. The child components 405-1 and 405-2 may provide different menu item UI elements in the menu UI element of parent component 403-1. The grandchild components 407-1 and 407-2 may provide sub-items in the menu UI element of child component 405-1. The child component 405-3 may provide a button UI element (e.g., a "checkout" button) for the shopping cart UI element of parent component 403-2. It should be appreciated that the above example hierarchy of UI elements for a web application is present by way of example only.

Once a web application is released to production, it may undergo continuous enhancements and bug fixes. Such enhancements and/or bug fixes may include updates to the front-end or back-end of a web application, changes on the UI, etc. In any software development lifecycle (SDLC) approach, testers will test web application requirements in each "sprint" or release using different testing strategies and approaches. In most cases, this testing takes place in a staging or pre-production environment before releasing the new version of the web application to a production environment.

Functional and regression testing of web applications requires a significant amount of time and manual effort. In order to reduce this time and cost, various testing automation tools may be leveraged. Such testing automation tools include, but are not limited to Selenium, WinApp driver, Cypress, etc. Generally, testing automation tools identify UI elements of a web application (e.g., text boxes, radio buttons, dropdown menus, forms, etc.) by using Extensible Markup Language (XML) Path Language (XPath) or CSS. Such approaches find the location of any particular element on a web page of a web application using an HTML DOM structure, and use such elements in test scripts for UI actions.

For test automation of web applications, automation testing engineers may expend significant time and effort to add and/or update the locators of UI elements depending upon the UI changes between different versions of a web application. Illustrative embodiments provide tools which compare the UI of different versions of a web application (e.g., a previous release/state and a current release/state) to determine the differences therebetween, and to use such determined differences for performing testing of the web application. In some embodiments, the differences may be determined in the context of functional test automation which includes: differences with respect to UI elements, HTML, CSS, JS, etc., including attributes that will be used for functional and regression testing automation; and generating locators (e.g., XPath, CSS) of both existing and newly-added UI elements. The technical solutions described herein can thus be used to help test engineers to analyze the differences, to update locators in testing scripts as needed, etc.

Web applications may undergo frequent enhancements with every sprint/release. As part of the software testing lifecycle (STLC), testers may adapt different testing strategies and approaches to meet the quality of deliverables. The time and effort required to update test scripts with new or updated web elements is directly proportional to the number of changes requested in a particular release. It generally takes a lot of time to update these changes in automation test scripts. Web applications with rich, layered UIs including hundreds or perhaps thousands of UI elements that require updates in the test scripts can increase the time and resources needed for maintenance of automation test suites. Further, such updates are prone to human errors, omitting test coverage, and have significant overhead resulting in significant cost/time used.

Web application automation testing allows web application software to be put through multiple test scenarios, and it also allows the same tests to be run repeatedly, quickly and accurately. Test results will be effective only if test scripts are written correctly and the right tools are in place. As the pace and frequency of changes to web applications increase, it becomes time consuming to update one or more application testing suites each of which may include one or several automation tests that are to be run on web applications for testing UI changes to web applications.

The technical solutions described herein provide a web application UI comparator tool, which can provide various advantages and improvements for testing new releases of web applications. The web application UI comparator tool described herein, for example, is configured to compare the source code of a web application (e.g., before or after the web application has been deployed to production). This is in contrast with approaches that compare different version of a web application by analyzing the DOM (e.g., post-deployment). The web application UI comparator tool described herein is configured to parse for differences in front-end source code files of two different versions of a web application, identifies elements (e.g., HTML elements) which have changed, and generates the differences between the two different versions of the web application. The differences may be with respect to UI elements in HTML, CSS, JS and other front-end source code files. These files contain the attributes which are responsible for UI changes. The web application UI comparator tool is configured to highlight differences of the UI elements between different versions of a web application (e.g., for each HTML file) and helps user to identify any changes made to a web application between different versions quickly and automatically.

Web applications may undergo frequent enhancements with every sprint/release. With STLC, testers could adapt different testing strategies and approaches to meet the quality of deliverables. The time which goes in to updating the test scripts with the new or updated web elements is directly proportional to the number of changes requested in a particular release. It generally takes a lot of time and manual effort to update these changes in automation test scripts. Web Applications with rich, layered user interfaces with hundreds or perhaps thousands of UI elements that require updates in the test scripts can increase the maintenance of automation test suites which could be prone to human errors, omitting test coverage and overhead to cost/time.

Web Application automation testing allows software to be put through multiple test scenarios, and it also allows the same tests to be run repeatedly, quickly, and accurately. Test results will only be effective, however, if test scripts are written correctly and the right tools are in place. With the ever-changing nature of many web applications, it is time-consuming to update one or more multiple test suites which contain several automation tests to account for UI changes of web applications.

The technical solutions described herein provide a web application UI comparator tool that makes an end-user's job easier by letting the end-user specify different versions of a web application (e.g., current and previous versions) to be compared, and which generates an output that highlights the differences of the UI elements of the web application for the different versions (e.g., for each HTML, CSS and JS files) which advantageously helps the end-user to identify changes in the web application quickly and automatically. Once the previous and current versions of the web application are specified (e.g., located), the web application UI comparator tool will start parsing the source code files which are responsible for the front-end of the web application. Such source code files illustratively include HTML, CSS and JS files, which are responsible for generating web elements using HTML. HTML files include HTML tags, attributes, inner text, inline stylings, etc. CSS files include classes and selectors. JS files include various classes and methods. The differences between the different versions of the web application may be used to generate a JavaScript Object Notation (JSON) object, which is then categorized and rendered to a graphical user interface (GUI) of a client device (e.g., associated with a test engineer or other user utilizing the web application UI comparator tool).

Once the comparison between the different versions of the web application is completed, the web application UI comparator tool may provide various results or outputs, including but not limited to: a list of added, deleted or changed elements of the web application, along with clickable links or buttons (e.g., which may be in the form of XPath or CSS locators for the elements) allowing a user to view such added, deleted or changed elements in the different versions of the web application; and a report with one or more tables or other data structures listing the element differences (e.g., additions, deletions and modifications) between the different versions of the web application. In some embodiments, reports generated by the web application UI comparator tool will group the element differences according to type (e.g., HTML differences, styling differences, etc.) to let a user view them using a "tabular view" link. The reports generated by the web application UI comparator tool may also provide clickable links, buttons or other interface features for viewing generated "locators" (e.g., XPath, CSS, etc.) for the elements of the web application that are changed (e.g., added, deleted or modified).

The reports generated by the web application UI comparator tool advantageously provide convenience, efficiency, speed and accuracy for testers and software developers, as well as improved customer or other end-user satisfaction through various levels of reporting. The web application UI comparator tool can further be utilized for tracking UI changes for current release requirements, and for identifying regression defects early in a release cycle. The reports in some embodiments may be used to automatically select and run test cases on different versions of the web application which are focused on the changed elements of the web application's UI. The web application UI comparator tool can help test engineers, developers or other users to compare two different versions of a web application at any given time, and to automate generation of artifacts (e.g., element locators, reports) which can expedite test automation, including but not limited to functional and regression testing.

Figure 5:
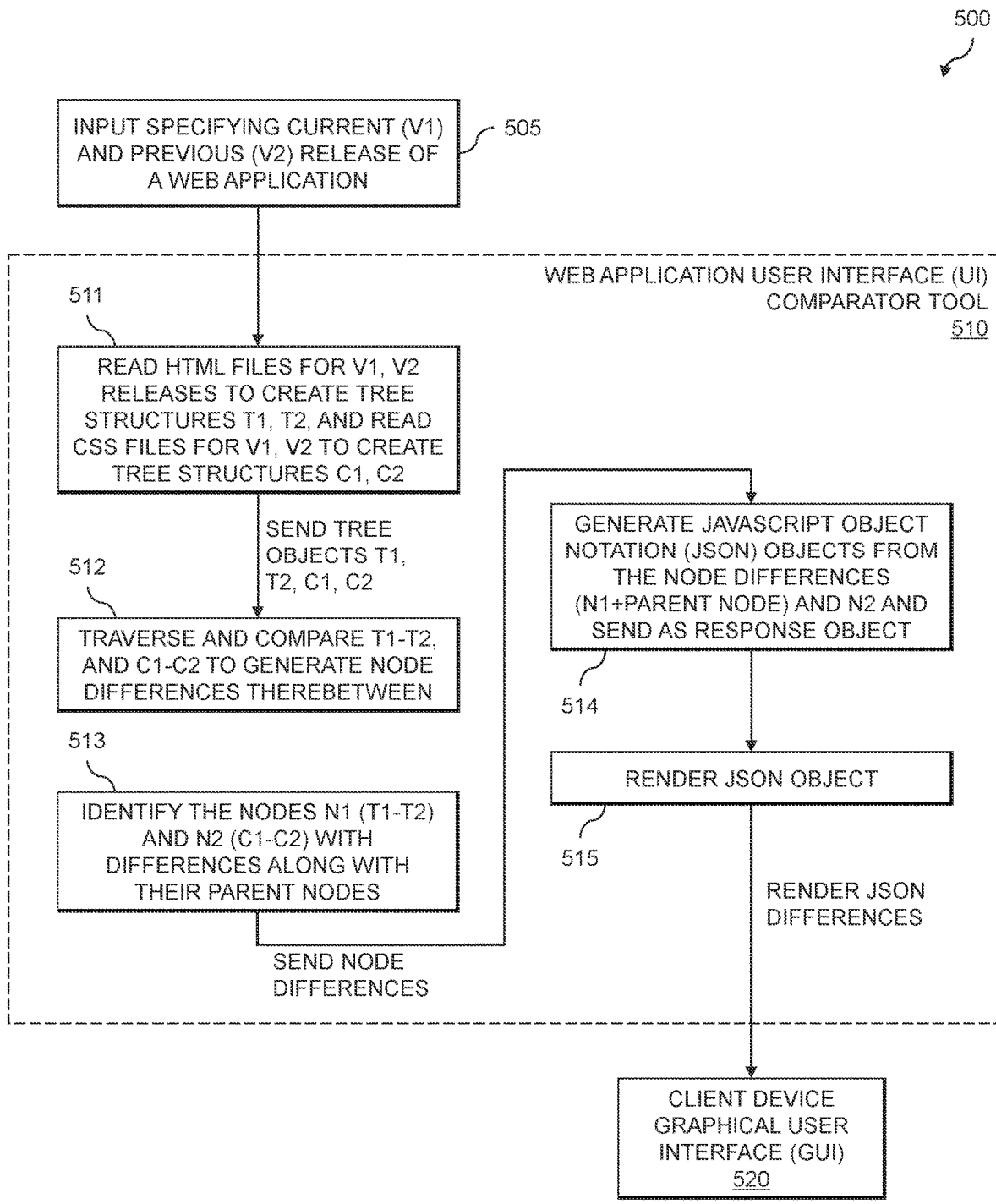
FIG. 5 shows a system flow for generating a comparison of user interface elements of different versions of a web application in an illustrative embodiment.

FIG. 5 shows a workflow 500 for utilization of a web application UI comparator tool 510. The workflow 500 begins with input 505 specifying current (e.g., V1) and previous (e.g., V2) versions of a web application or a portion thereof (e.g., a web page of a web application). The input 505 may specify the location of source code files (e.g., for the front-end of the web application) for both the current (V1) and previous (V2) release of the web application. The web application UI comparator tool 510 in step 511 reads the source code files from the specified locations, and generates tree structures. This illustratively includes reading HTML files for the V1 and V2 releases to create tree structures T1 and T2, respectively, and reading CSS files for the V1 and V2 releases to create tree structures C1 and C2, respectively. Although not shown in FIG. 5, JS files may also be analyzed for the V1 and V2 releases to create tree structures J1 and J2, respectively. Step 511 may utilize a function that converts HTML tags into the tree data structures T1, T2 (e.g., for HTML file differences), C1, C2 (e.g., for CSS file differences), and optionally J1, J2 (e.g., for JS file differences). In step 512, the tree structures T1 and T2 are traversed and compared to generate an object N1 containing the node differences of tree structures T1 and T2, and the tree structures C1 and C2 are traversed and compared to generate an object N2 containing the node differences of tree structures C1 and C2. Optionally, the tree structures J1 and J2 may be traversed and compared to generate an object N3 containing the node differences of tree structures J1 and J2. In step 513, the nodes in N1 and N2 (and optionally N3) with differences between the current and previous releases of the web application are identified, along with their parent nodes. In step 514, the node differences object N1 and a parent node are sent to a function to create JSON objects. This function will also receive the node differences object N2 (e.g., for CSS file differences) and optionally the node differences object N2 (e.g., for JS file differences), and identify corresponding HTML tags sharing the styling changes (e.g., classes) with the CSS file differences and optionally the JS file differences). It should be noted that the steps 511 through 514 may be performed for each of the source code files. In step 515, the JSON objects generated in step 514 are rendered on a client device graphical user interface (GUI) 520. This may include presenting visualizations of the UI differences between the current and previous releases of the web application (e.g., of added/deleted/removed web elements). In some embodiments, this also includes categorizing element differences for the current and previous version of the web application in a tabular format. The tabular format, for example, may categorize differences as being additions, deletions, and updates/modifications. The categorized JSON data may then be rendered on the client device GUI 520 (e.g., as a table, in a tabular format with different tabs for element additions, deletions and updates/modifications, etc.).

Figure 7:
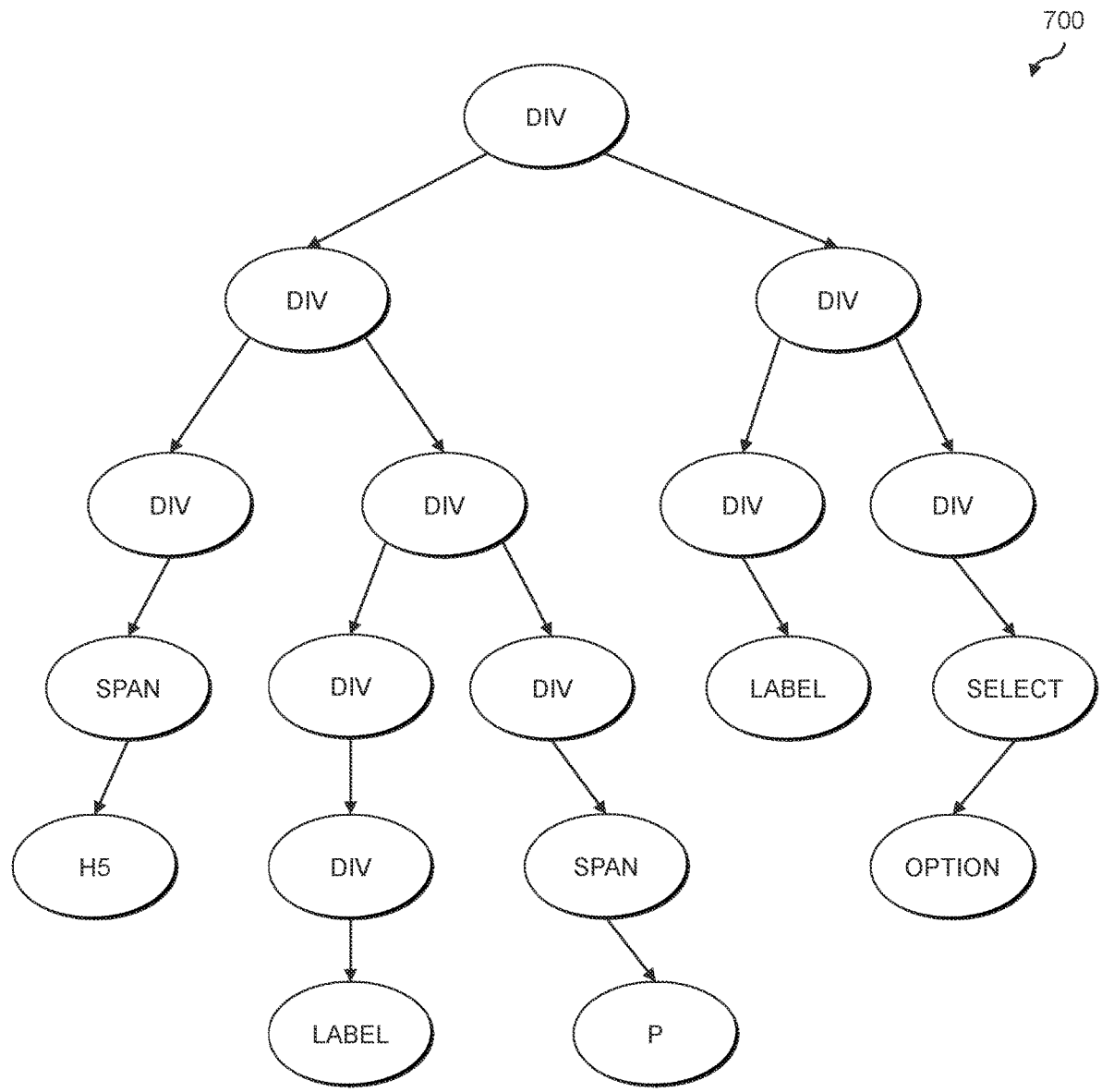
FIG. 7 shows a tree structure converted from the HTML source code file of FIG. 6 in an illustrative embodiment.
Figure 8:
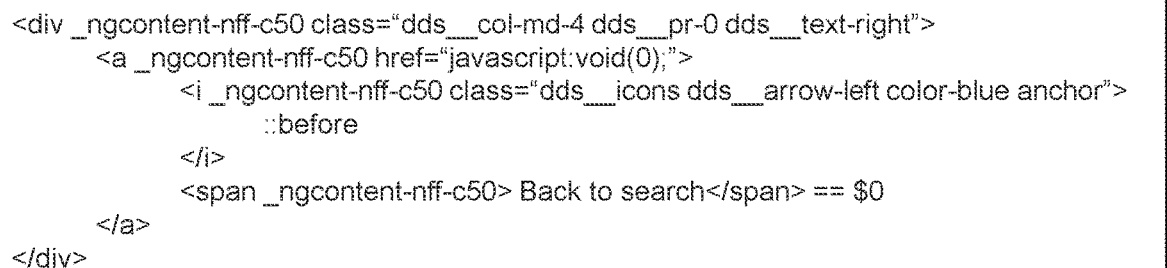
FIG. 8 shows source code added to an HTML source code file for a web application in an illustrative embodiment.
Figure 9A:
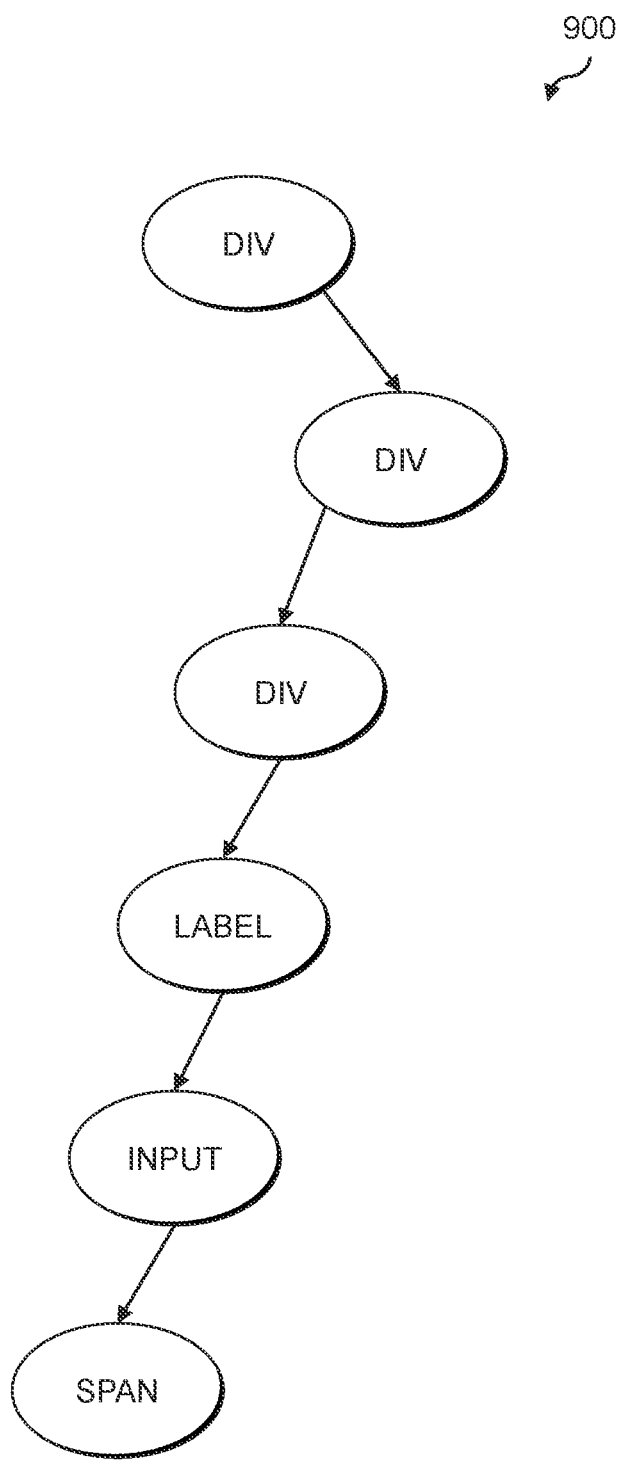
FIGS. 9A and 9B show tree structures with and without the added source code of FIG. 8 in an illustrative embodiment.
Figure 9B:
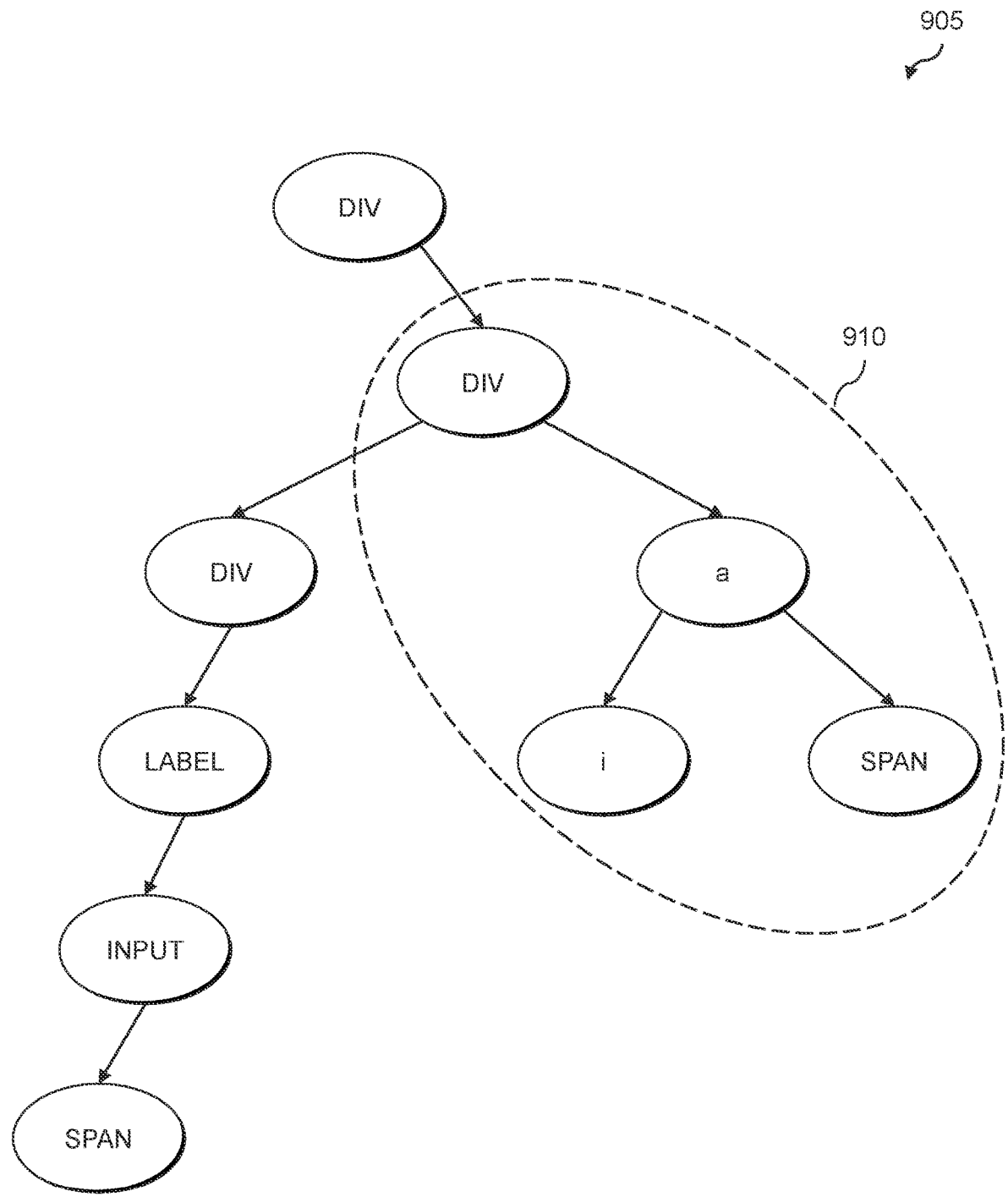

FIG. 6 shows an example of web application source code in an HTML file 600, and FIG. 7 shows how the source code in the HTML file 600 is converted to a tree structure 700. FIG. 8 shows an example of web application source code in another HTML file 800, representing added elements. FIG. 9A shows an HTML tree structure 900 prior to the addition of elements shown in the HTML file 800, and FIG. 9B shows an HTML tree structure 905 with the addition of the elements shown in the HTML file 800. In the HTML tree structure 905 of FIG. 9B, the new paths are outlined 910, and include a path: div→a→i, and div→a→span.

Figure 10:
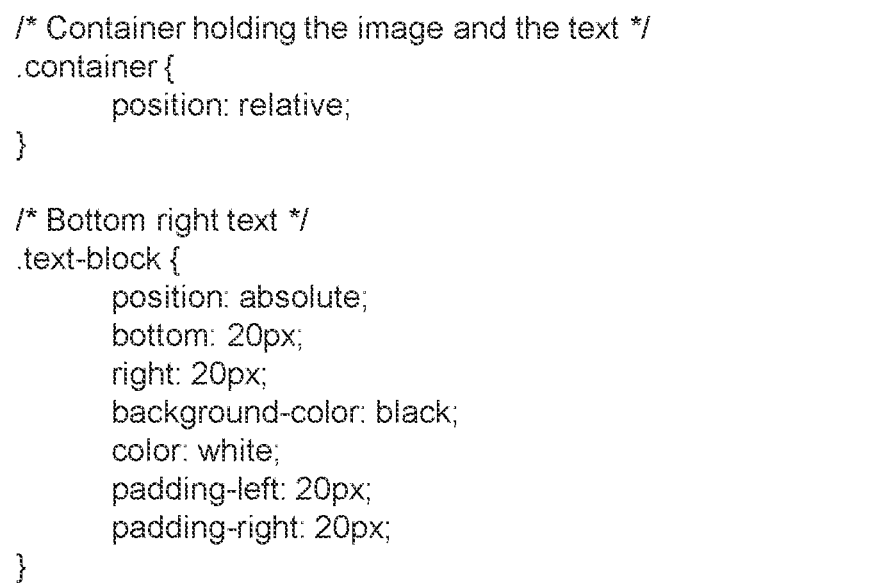
FIG. 10 shows a Cascading Style Sheets (CSS) source code file for a web application in an illustrative embodiment.
Figure 11A:
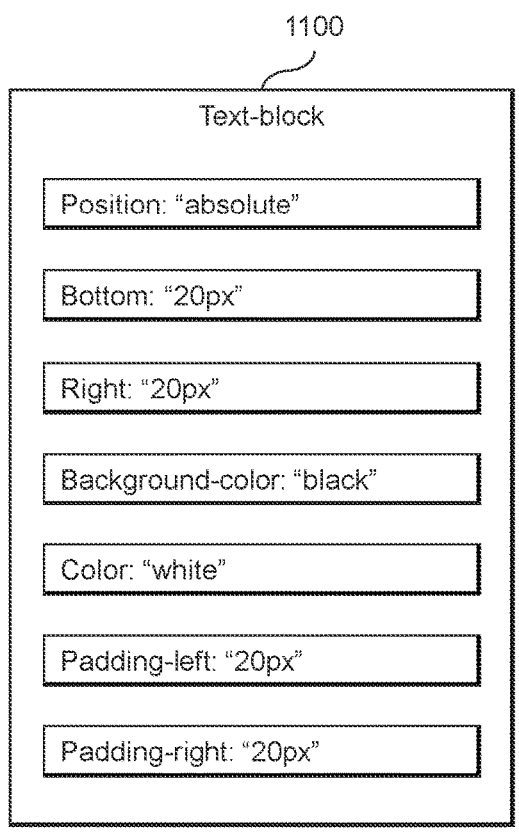
FIGS. 11A and 11B show CSS objects converted from CSS source code files of different versions of a web application in an illustrative embodiment.
Figure 11B:
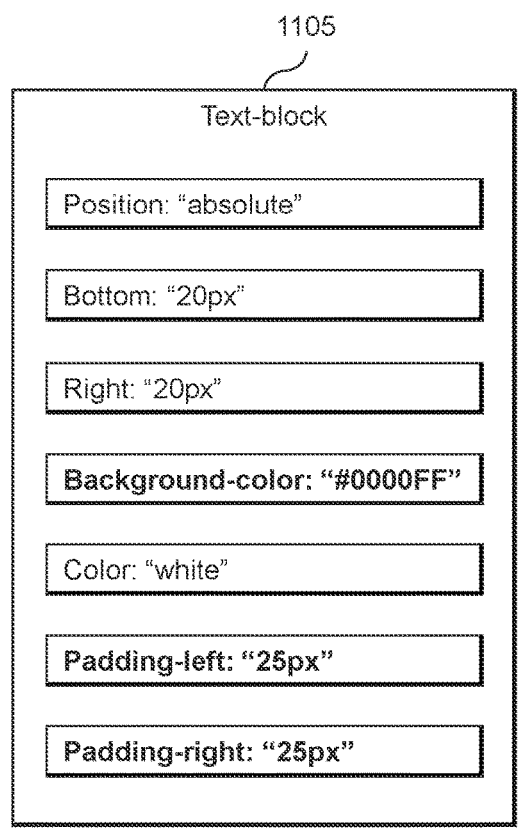

FIG. 10 shows an example of web application source code in a CSS file 1000. FIG. 11A shows the CSS file 1000 converted to an object 1100, and FIG. 11B shows object differences 1105 for changes to the CSS file 1000 highlighted in bold. Here, the changes are to the background color (black→#0000FF), left padding (20 pixels (px)→25 px) and right padding (20 px→25 px).

Figure 12A:
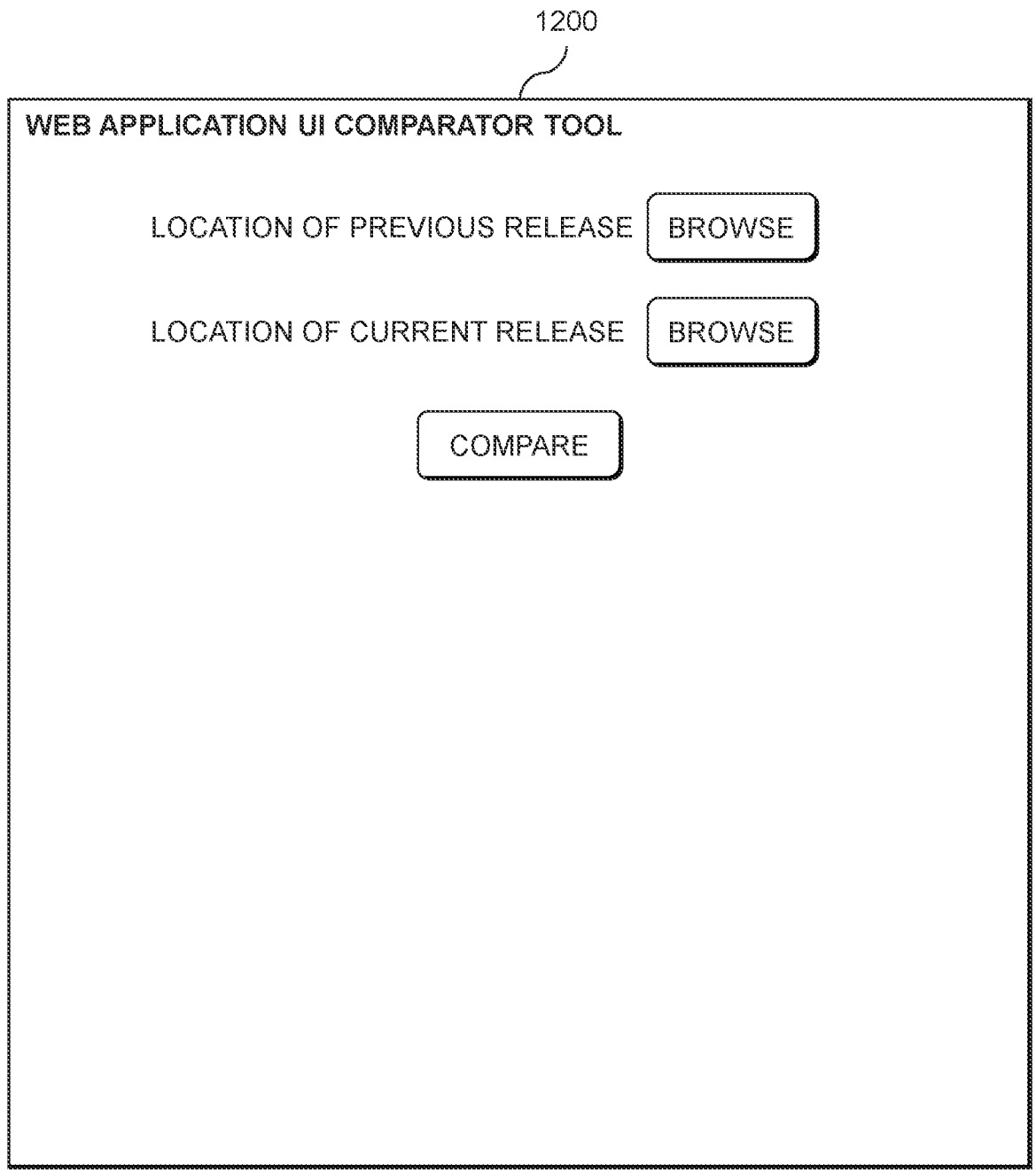
FIGS. 12A-12C show user interface views of a graphic user interface web application comparator tool in an illustrative embodiment
Figure 12B:
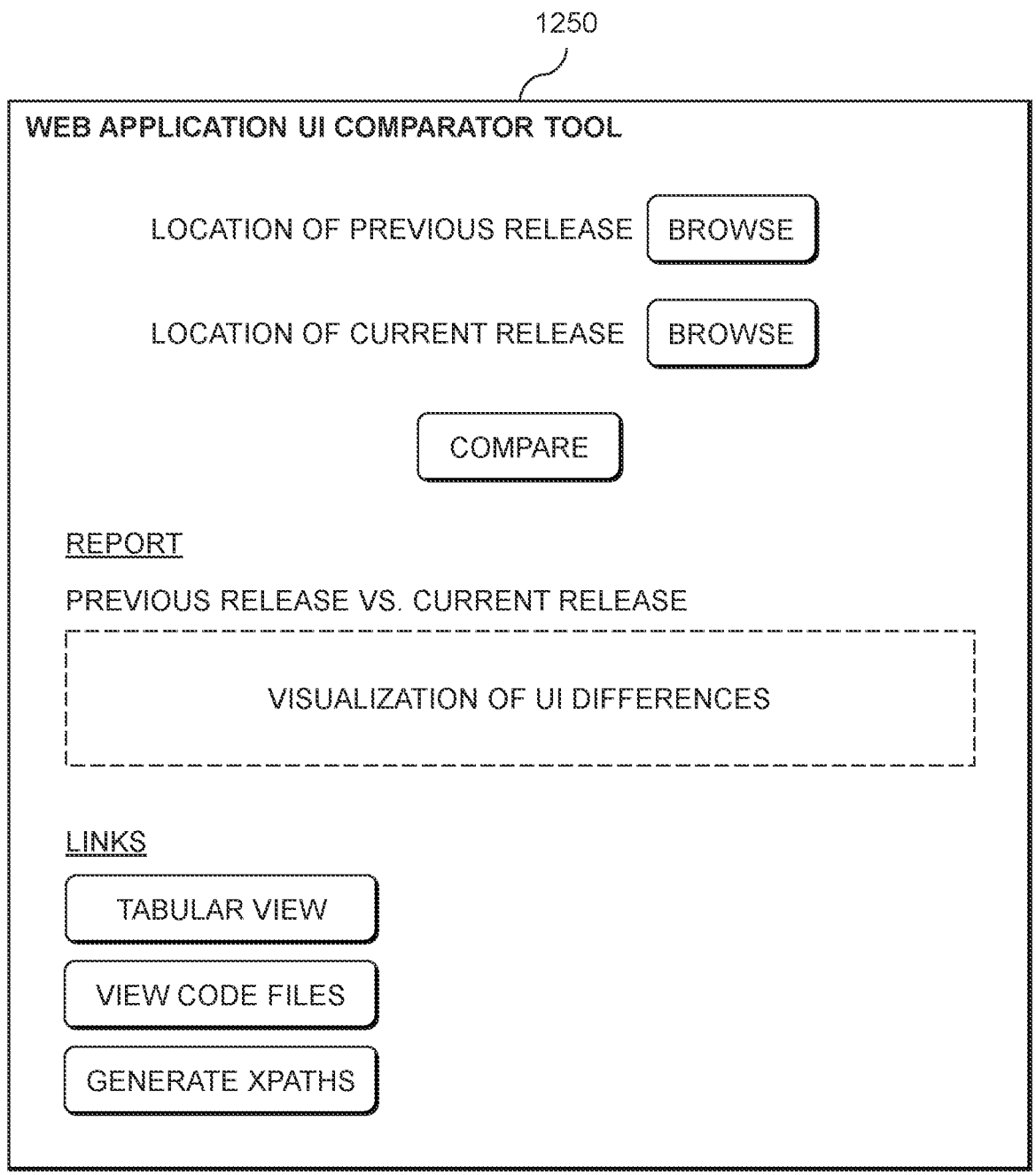

FIGS. 12A and 12B show example interface screens of the web application UI comparator tool 510 which may be rendered on the client device GUI 520. FIG. 12A shows an interface screen 1200 of the web application UI comparator tool 510 which enables a user to input selections of the locations of web application versions to be compared (e.g., input 505 in the workflow 500 of FIG. 5, where the locations are where the source code files for the current and previous releases are stored). Here, a user may be prompted to provide or input the locations of the source code files of the previous and current releases of a web page of a web application through clicking or selecting respective "browse" buttons. Once such links are selected, the web application UI comparator tool 510 is run when the user clicks or selects the "compare" button.

Once the compare button is selected, the web application UI comparator tool 510 will perform the steps 511 through 515 described above and generate the output interface screen 1250 shown in FIG. 12B. Following the "compare" processing, the interface is updated with a report which shows visualization of UI differences between the previous and current releases of the web application (e.g., changes from the previous release to the current release, and changes from the current release to the previous release). This may include, for example, visualizations such as images or screenshots of the changed UI elements (e.g., pictures of added/deleted/modified UI elements), on a page-by-page basis for different web pages of the web application. The output interface screen 1250 shown in FIG. 12B also includes artifacts produced by the web application UI comparator tool 510, including links (e.g., buttons or other interface features) allowing a user: to access a tabular view of the changes between the previous and current releases of the web application; to view code files of the changed UI elements; and to generate locators (e.g., XPaths) to the changed UI elements. Selection of the tabular view link may redirect the interface of the web application UI comparator tool 510 to a table structure with different columns or tabs showing, for example, added and deleted element locators listed with corresponding element types. In some embodiments, the tabular view may be color coded or otherwise have visual effects that highlight the categories (e.g., green for added elements, red for deleted elements, yellow for modified elements).

Figure 12C:
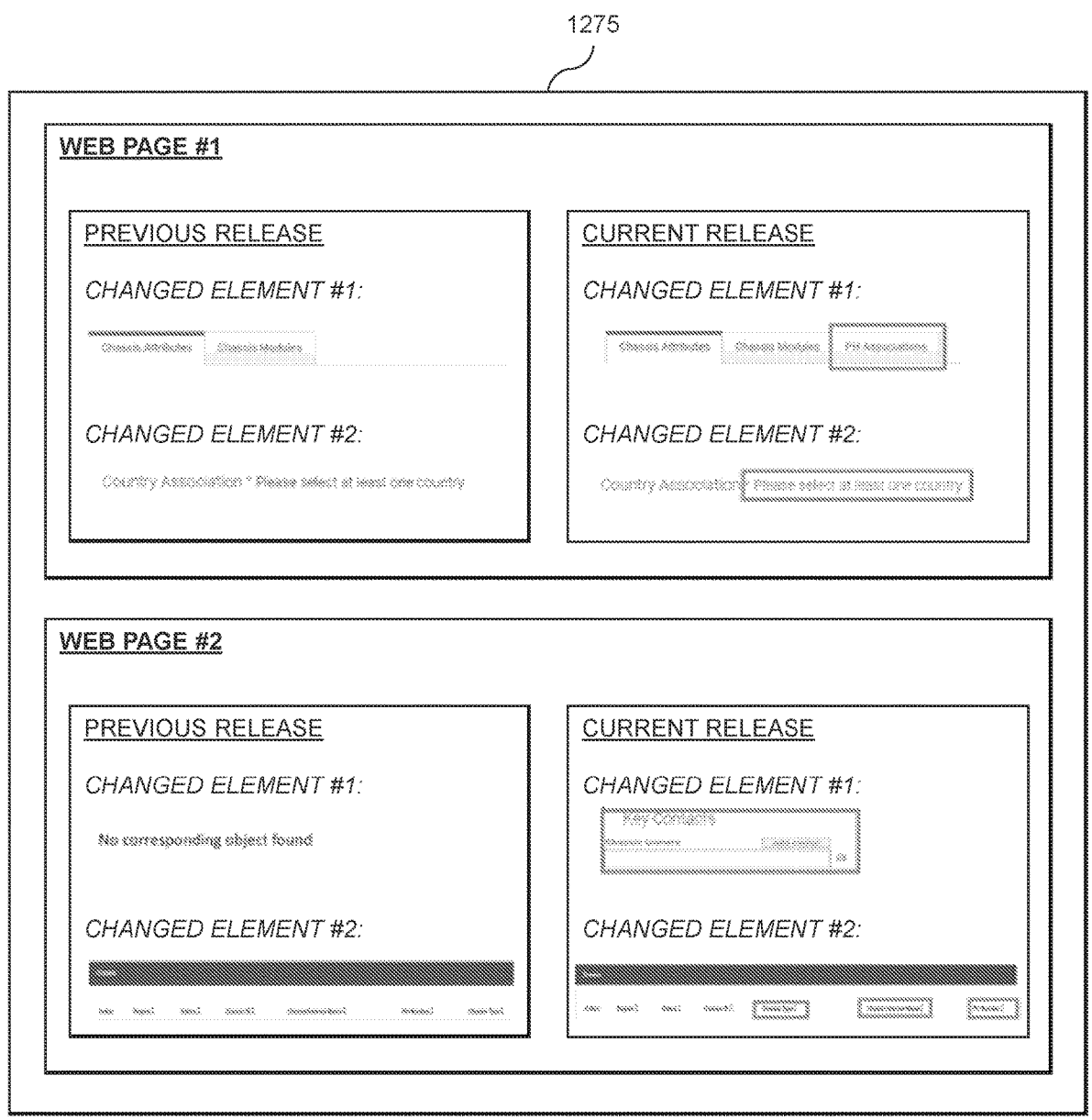

FIG. 12C shows an example visualization 1275 of the web element differences which may be displayed as the visualization of UI differences in the output interface screen 1250 of FIG. 12B. The report or results here includes changes for two web pages of a web application. The first web page has two changes between the previous and current releases. The first changed element is the addition of a new tab (e.g., "PH Associations"). The second changed element is a change in the font color of "Please select at least one country" (e.g., from black to red). The second web page also has two changes between the previous and current releases. The first changed element is the addition of a new element object for "Key Contacts" which has no corresponding object in the previous release). The second changed element includes changes to the labeling/ordering of the last three columns of a table (e.g., from "Chassis External Name, PH Number, Chassis Type" to "Chassis Type, Chassis Internal Name, PH Number"). The first four columns of the table (e.g., Action, Region, Status, Chassis ID) remain the same and in the same order.

Various use cases or scenarios will now be described, including element addition, deletion, and modification.

Element addition: assume that a new element is added to a current release of a web page of a web application, such as an input tag (e.g., <input>) and its label tag (e.g., <label>) under a heading tag (e.g., an <h3> tag) in the current release (V2) of the web page of the web application. When the source code files of the current and previous releases of the web page of the web application are converted to the tree structures T1 and T2, the tree structures T1 and T2 will be compared and return a node difference of the node <input><label>. The function will also consider the parent node (e.g., the <h3>tag) and render all three tags (e.g., <h3>, <input>, <label>) on the report or results which are output on the client device GUI. The significance of the "parent" tag is to assist the end-user to find the section or location where the change is made in the new version. For element addition, the visualization rendered on the client device GUI will indicate "No object found" (or similar language) in the visualization of the previous release, as shown in FIG. 12C (e.g., the text "No corresponding object found" for the changed element #2 of web page #2).

Element deletion: assume that an element is deleted in a current release of a web page of a web application, such as an input tag (e.g., an <input> tag) that is in the previous release (V2) of the web page of the web application but which is not in the current release (V1) of the web page of the web application. This will result in a node difference between the tree structures T1 and T2 (e.g., generated by converting HTML files for the current and previous releases of the web page of the web application). The parent node along with the input tag is rendered on the report or results which are output on the client device GUI. The significance of the "parent" tag is to assist the end-user to find the section or location where the change is made in the new version. For element deletion, the visualization rendered on the client device GUI will indicate "No object found" (or similar language) in the visualization of the current release.

Figure 13:
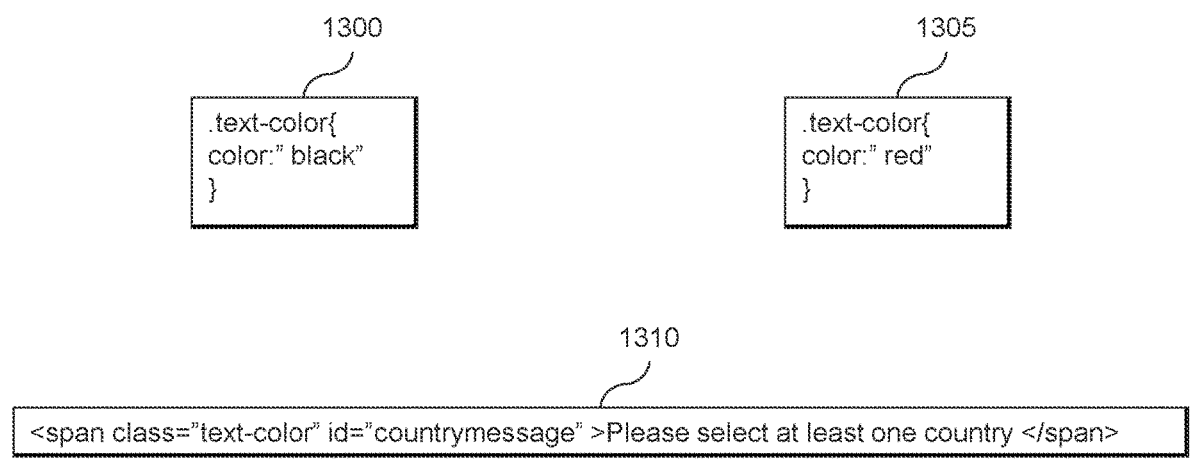
FIG. 13 shows code snippets of a CSS style change affecting a portion of HTML source code of a web application in an illustrative embodiment.

Element modification: assume that there are no added or deleted web elements between current and previous releases of a web page of a web application, but there is a change in element property of an element between the current and previous releases of the web page of the web application. More specifically, consider an element property change where the color of a text is changed from black to red, and where CSS is responsible for the styling. FIG. 13 shows the CSS styling 1300 for the previous release and the CSS styling 1305 for the current release (e.g., both for .text-color) and a corresponding HTML code snippet 1310 which references the ".text-color" CSS styling. Here, the node attribute of the CSS object (e.g., text-color) has the difference. The web application UI comparator tool described herein would identify any HTML nodes using the class name of the CSS object with the difference between the current and previous releases, and also identifies the parent node of the impacted nodes (e.g., again, to assist the end-user to find the section or location where the change is made in the new version) and displays them on the report or results which are output on the client device GUI. This change (e.g., of the font color from black to red) corresponds to the changed element #2 of the web page #1 in the example visualization 1275 of FIG. 12C. It should be noted that this type of change (e.g., in CSS class implementation) would not be detected by comparing DOMs of the current and previous releases of the web application.

There are various corner cases to be considered, including that test data should be the same across the current and previous releases for best results. Further, there are some aspects of web applications which are out of scope of the techniques described herein, including pop-ups, modals and business logic whose changes cannot be validated.

The technical solutions described herein provide various technical advantages. The web application UI comparator tool, for example, aims at providing a comparison of the source code of the web application (e.g., HTML and CSS files for the front-end of the web application) and generates UI differences even before deployment (e.g., of one or both of the current and previous releases). This helps developers and test engineers to identify the differences, and helps with early detection of defects. Further, the accuracy of defects identified using the web application UI comparator tool is higher. The web application UI comparator tool is also simple to use by various stakeholders, and is not limited to use in any particular stage of the SDLC. The web application UI comparator tool also advantageously provides visual comparison of two versions of the web application source code (e.g., by highlighting all additions, removals, and modifications). The web application UI comparator tool can also be used for comparison across different environments, such as development, testing, staging and production environments. Further, the web application UI comparator tool not only considers the HTML files for difference generation (e.g., which are responsible for DOM generation), but also considers CSS and JavaScript (JS) files which have the implementation of CSS and JS classes, selectors and methods. Any changes done to the CSS and JS files which are responsible for application enhancement will additionally be detected, as the source code comparator logic binds HTML, CSS and JS files from the source code.

When there are different environments (e.g., staging, production, etc.) for a complex web application with multiple web pages, and if the SDLC is rigorous with frequent releases (e.g., weekly release), usage of the web application UI comparator tool provides significant advantages in helping end-users to identify potential defects in the web application. Efforts invested in testing UI-related changes in various cycles, including functional and regression cycles, can thus be cut down by a huge percentage in performing meticulous tasks. This allows testers to focus more on testing the logic of the web application, coverage, and other activities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for source code-based determination of differences between web elements of different versions of a web application will now be described in greater detail with reference to FIGS. 14 and 15. Although described in the context of system 100, these platforms may also be used to implement at least portions of other information processing systems in other embodiments.

Figure 14:
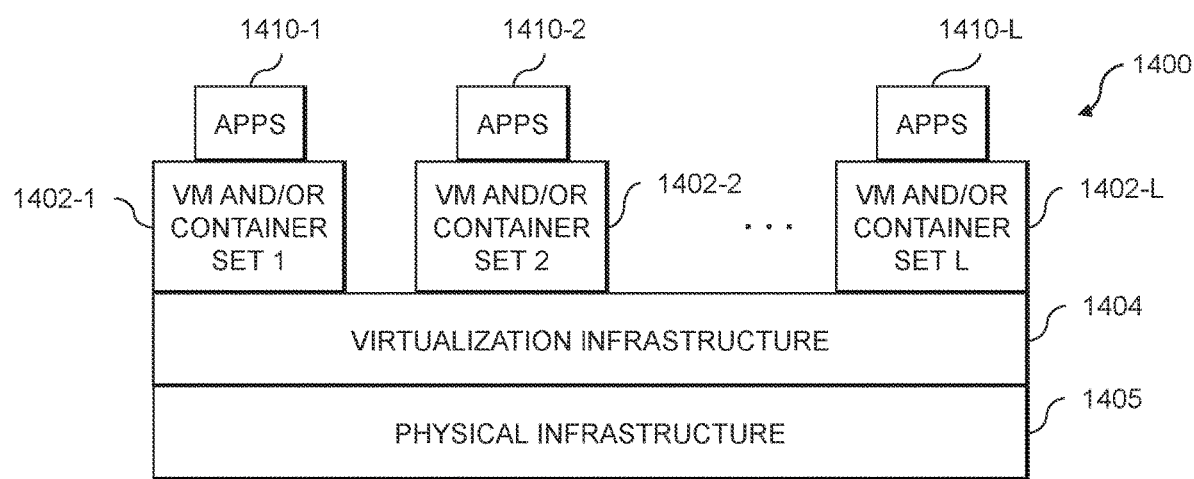
FIGS. 14 and 15 show examples of processing platforms that may be utilized to implement at least a portion of an information processing system in illustrative embodiments.
Figure 15:
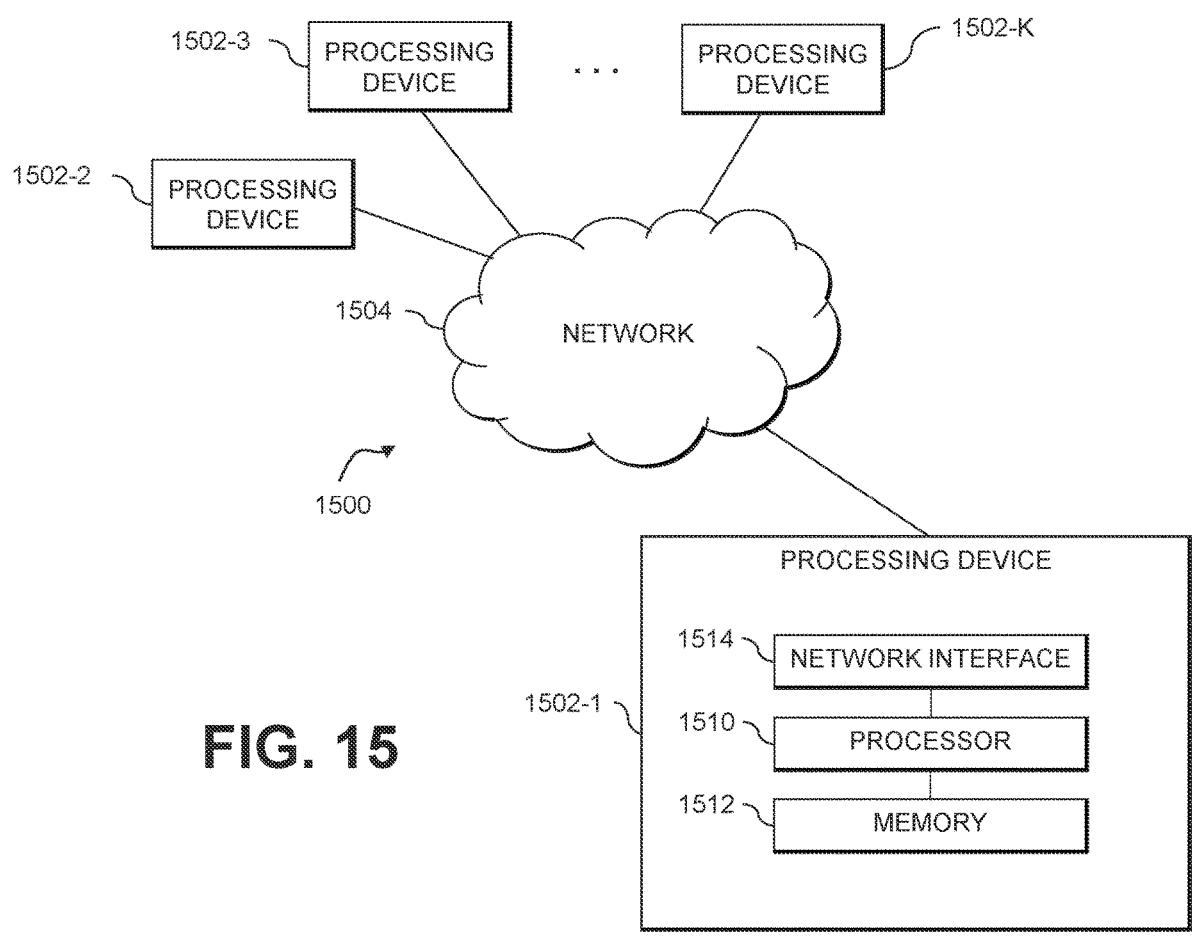

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for source code-based determination of differences between web elements of different versions of a web application as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, web application components, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to select first and second versions of at least a given portion of a web application;
to obtain a first set of source code files used for generating a front end of the first version of the given portion of the web application and a second set of source code files used for generating a front end of the second version of the given portion of the web application;
to generate a first set of one or more tree structures based at least in part on the first set of source code files and a second set of one or more tree structures based at least in part on the second set of source code files, the first and second sets of one or more tree structures comprising nodes representing web elements of the given portion of the web application;
to identify node differences between the first and second sets of one or more tree structures;
to generate, based at least in part on the identified node differences, information characterizing differences between web elements in the first and second versions of the given portion of the web application; and
to initiate execution of at least one automated action based at least in part on the generated information characterizing differences between web elements in the first and second versions of the given portion of the web application;
wherein the at least one automated action comprises configuring a data structure characterizing web elements which are added, deleted and modified in the first version of the given portion of the web application relative to the second version of the given portion of the web application, the data structure comprising one or more links to respective ones of the first and second sets of source code files associated with the web elements which are added, deleted and modified in the first version of the given portion of the web application relative to the second version of the given portion of the web application.

2. The apparatus of claim 1 wherein the first version of the given portion of the web application is associated with a current release of the web application and the second version of the given portion of the web application is associated with a previous release of the web application.

3. The apparatus of claim 1 wherein at least one of the first version of the given portion of the web application and the second version of the given portion of the web application comprises a non-production version of the given portion of the web application.

4. The apparatus of claim 1 wherein the given portion of the web application comprises a web page of the web application.

5. The apparatus of claim 1 wherein selecting the first and second versions of the given portion of the web application comprises:
selecting a first location where the first set of source code files used for generating the front end of the first version of the given portion of the web application are stored; and
selecting a second location where the second set of source code files used for generating the front end of the second version of the given portion of the web application are stored.

6. The apparatus of claim 1 wherein each of the first and second sets of source code files comprises one or more Hypertext Markup Language (HTML) files and one or more Cascading Style Sheets (CSS) files.

7. The apparatus of claim 1 wherein:
the first set of one or more tree structures comprises a first tree structure generated based at least in part on one or more Hypertext Markup Language (HTML) files in the first set of source code files and a second tree structure generated based at least in part on one or more Cascading Style Sheets (CSS) files in the first set of source code files; and the second set of one or more tree structures comprises a third tree structure generated based at least in part on one or more HTML files in the second set of source code files and a fourth tree structure generated based at least in part on one or more CSS files in the second set of source code files.

8. The apparatus of claim 7 wherein identifying the node differences between the first and second tree structures comprises:

identifying one or more nodes present in the first tree structure which are not present in the third tree structure as added web elements in the first version of the given portion of the web application; and identifying one or more nodes present in the third tree structure which are not present in the first tree structure as deleted web elements in the first version of the given portion of the web application.

9. The apparatus of claim 7 wherein identifying the node differences between the first and second tree structures comprises identifying one or more nodes having element properties in the first tree structure that are different than element properties in corresponding nodes in the third tree structure as modified web elements in the first version of the given portion of the web application.

10. The apparatus of claim 7 wherein identifying the node differences between the first and second tree structures comprises identifying one or more nodes in the first tree structure which reference styling properties in the second tree structure which are different than styling properties in the fourth tree structure as modified web elements in the first version of the given portion of the web application.

11. The apparatus of claim 1 wherein the at least one automated action further comprises generating, based at least in part on at least a portion of the data structure, one or more visualizations of the web elements which are added, deleted and modified in the first version of the given portion of the web application relative to the second version of the given portion of the web application.

12. The apparatus of claim 1 wherein the data structure further comprises: a tabular view categorizing which of the web elements are added, deleted and modified in the first version of the given portion of the web application relative to the second version of the given portion of the web application.

13. The apparatus of claim 1 wherein the at least one automated action further comprises running one or more automation test cases for testing web elements in the first version of the given portion version of the web application which are changed relative to the second version of the given portion of the web application.

14. The apparatus of claim 13 wherein the one or more automation test cases are selected from an automation testing suite, the one or more automation test cases being customized for testing of the web elements in the first version of the given portion of the web application which are changed relative to the second version of the given portion of the web application.

15. A computer program product comprising a non-transitory processor-readable storage medium having stored therein program code of one or more software programs, wherein the program code when executed by at least one processing device causes the at least one processing device:

to select first and second versions of at least a given portion of a web application;

to obtain a first set of source code files used for generating a front end of the first version of the given portion of the web application and a second set of source code files used for generating a front end of the second version of the given portion of the web application;

to generate a first set of one or more tree structures based at least in part on the first set of source code files and a second set of one or more tree structures based at least in part on the second set of source code files, the first and second sets of one or more tree structures comprising nodes representing web elements of the given portion of the web application;

to identify node differences between the first and second sets of one or more tree structures;

to generate, based at least in part on the identified node differences, information characterizing differences between web elements in the first and second versions of the given portion of the web application; and to initiate execution of at least one automated action based at least in part on the generated information characterizing differences between web elements in the first and second versions of the given portion of the web application;

wherein the at least one automated action comprises configuring a data structure characterizing web elements which are added, deleted and modified in the first version of the given portion of the web application relative to the second version of the given portion of the web application, the data structure comprising one or more links to respective ones of the first and second sets of source code files associated with the web elements which are added, deleted and modified in the first version of the given portion of the web application relative to the second version of the given portion of the web application.

16. The computer program product of claim 15 wherein:

the first set of one or more tree structures comprises a first tree structure generated based at least in part on one or more Hypertext Markup Language (HTML) files in the first set of source code files and a second tree structure generated based at least in part on one or more Cascading Style Sheets (CSS) files in the first set of source code files; and the second set of one or more tree structures comprises a third tree structure generated based at least in part on one or more HTML files in the second set of source code files and a fourth tree structure generated based at least in part on one or more CSS files in the second set of source code files.

17. The computer program product of claim 16 wherein identifying the node differences between the first and second tree structures comprises:

identifying one or more nodes present in the first tree structure which are not present in the third tree structure as added web elements in the first version of the given portion of the web application;

identifying one or more nodes present in the third tree structure which are not present in the first tree structure as deleted web elements in the first version of the given portion of the web application;

identifying one or more nodes having element properties in the first tree structure that are different than element properties in corresponding nodes in the third tree structure as modified web elements in the first version of the given portion of the web application; and identifying one or more nodes in the first tree structure which reference styling properties in the second tree structure which are different than styling properties in the fourth tree structure as modified web elements in the first version of the given portion of the web application.

18. A method comprising steps of:

selecting first and second versions of at least a given portion of a web application;

obtaining a first set of source code files used for generating a front end of the first version of the given portion of the web application and a second set of source code files used for generating a front end of the second version of the given portion of the web application;

generating a first set of one or more tree structures based at least in part on the first set of source code files and a second set of one or more tree structures based at least in part on the second set of source code files, the first and second sets of one or more tree structures comprising nodes representing web elements of the given portion of the web application;

identifying node differences between the first and second sets of one or more tree structures;

generating, based at least in part on the identified node differences, information characterizing differences between web elements in the first and second versions of the given portion of the web application; and initiating execution of at least one automated action based at least in part on the generated information characterizing differences between web elements in the first and second versions of the given portion of the web application;

wherein the at least one automated action comprises configuring a data structure characterizing web elements which are added, deleted and modified in the first version of the given portion of the web application relative to the second version of the given portion of the web application, the data structure comprising one or more links to respective ones of the first and second sets of source code files associated with the web elements which are added, deleted and modified in the first version of the given portion of the web application relative to the second version of the given portion of the web application; and wherein the method is performed by at least one processing device comprising a processor coupled to a memory.

19. The method of claim 18 wherein:

the first set of one or more tree structures comprises a first tree structure generated based at least in part on one or more Hypertext Markup Language (HTML) files in the first set of source code files and a second tree structure generated based at least in part on one or more Cascading Style Sheets (CSS) files in the first set of source code files; and the second set of one or more tree structures comprises a third tree structure generated based at least in part on one or more HTML files in the second set of source code files and a fourth tree structure generated based at least in part on one or more CSS files in the second set of source code files.

20. The method of claim 19 wherein identifying the node differences between the first and second tree structures comprises:

identifying one or more nodes present in the first tree structure which are not present in the third tree structure as added web elements in the first version of the given portion of the web application;

identifying one or more nodes present in the third tree structure which are not present in the first tree structure as deleted web elements in the first version of the given portion of the web application;

identifying one or more nodes having element properties in the first tree structure that are different than element properties in corresponding nodes in the third tree structure as modified web elements in the first version of the given portion of the web application; and identifying one or more nodes in the first tree structure which reference styling properties in the second tree structure which are different than styling properties in the fourth tree structure as modified web elements in the first version of the given portion of the web application.

* * * * *